Patented Mar. 27, 1934

1,952,247

UNITED STATES PATENT OFFICE 1,952,247

PROCESS FOR PRODUCING WHITE AND COLORED RESERVES UNDER ANILINE BLACK

Robert Haller, Riehen, near Basel, Switzerland, assignor to firm of Society of Chemical Industry in Basle, Basel, Switzerland No Drawing. Application December 31, 1931, Serial No. 584,279. In Switzerland January 14, 1931

2 Claims. (Cl. 8—5)

It is known that in calico printing the formation of aniline black can be prevented locally by the use of alkaline agents. In a similar manner colored effects on an aniline black ground can be produced by the use of a reducing agent in presence of an alkali or alkali carbonate and a suitable dyestuff, such as a vat-dyestuff.

In the use of this color reserve method, particularly when a strong alkaline substance, such as a caustic alkali or an alkali carbonate, is used for producing the reserve effect, as indeed is essential when it is a question of fixing a vat dyestuff, certain difficulties arise which make the process a difficult one in practice. Thus, the colored pattern always shows a more or less strongly developed white border produced by the creeping of the hydroscopic alkali or alkali carbonate beyond the limit of the pattern.

The present invention overcomes this objection by using strongly basic, sparingly volatile organic derivatives of ammonia, such as triethanolamine, di- and monoethanolamine, hexahydroaniline, aliphatic hexahydronaphthylamine, etc. Such amines have a sufficiently strongly basic character to allow of their use, wholly or in part, in substitution for the alkalies that have the creeping effect.

In the U. S. Patents Nos. 1,705,818 and 1,790,950, it has been proposed to add sparingly volatile organic bases, such as ethanolamine, to vat-dyestuff pastes or to printing pastes comprising vat-dyestuffs. The object of the proposal, however, is merely to obtain an improved dispersion and tinctorial strength of the dyestuff. The improvement produced in the present invention by the addition of ethanolamine cannot be learned from the said specifications.

The printing colors are very easily compounded; for example, for a white reserve, the thickening is simply mixed with the amine in question, the mixture is printed on the dry fabric which has been prepared in the usual manner with an aniline black preparation, and the fabric is steamed, whereby a white pattern is obtained on a black ground.

The following examples illustrate the invention:—

Example 1

A white fabric is impregnated in the usual manner with a solution of the following composition:—

| | Grams |
|---|---|
| Sodium chloride | 4,800 |
| Sodium ferrocyanide | 11,500 |
| Aniline hydrochloride | 14,400 |
| Dissolved in 200 litres of water | |

The impregnated fabric is dried and printed with

| | Grams |
|---|---|
| British gum powder | 400 |
| Water | 400 |
| Triethanolamine | 200 |
| | 1,000 |

The fabric is steamed in the usual manner in the rapid steamer, oxidized, washed and dried. There is obtained a white effect on a black ground.

Example 2

The fabric, prepared with aniline black in the manner described in Example 1, is printed with

| | Grams |
|---|---|
| British gum powder | 230 |
| Water | 230 |
| Ciba blue 2BD paste (Colour Index No. 1184) | 90 |
| Triethanolamine | 180 |
| Potassium carbonate | 45 |
| Sodium formaldehyde sulphoxylate | 225 |
| | 1,000 |

The printed fabric is steamed in the rapid steamer, oxidized in the usual manner and dried, whereby a blue effect on a black ground is obtained.

What I claim is:—

1. A process for producing colored reserves under aniline black, wherein the reserve printed on the goods prepared with aniline black solution contains a sparingly volatile, strongly basic organic derivative of ammonia in admixture with a vat-dyestuff, an alkali carbonate, and the reducing agent necessary for fixing the vat-dyestuff.

2. A process of producing colored reserves under aniline black, wherein the reserve printed on the goods prepared with aniline black solution contains triethanolamine in admixture with a vat-dyestuff, an alkali carbonate, and the reducing agent necessary for fixing the vat-dyestuff.

ROBERT HALLER.